Oct. 9, 1923.
F. RIESNER
REVERSE VALVE MECHANISM
Filed July 26, 1921
1,470,483
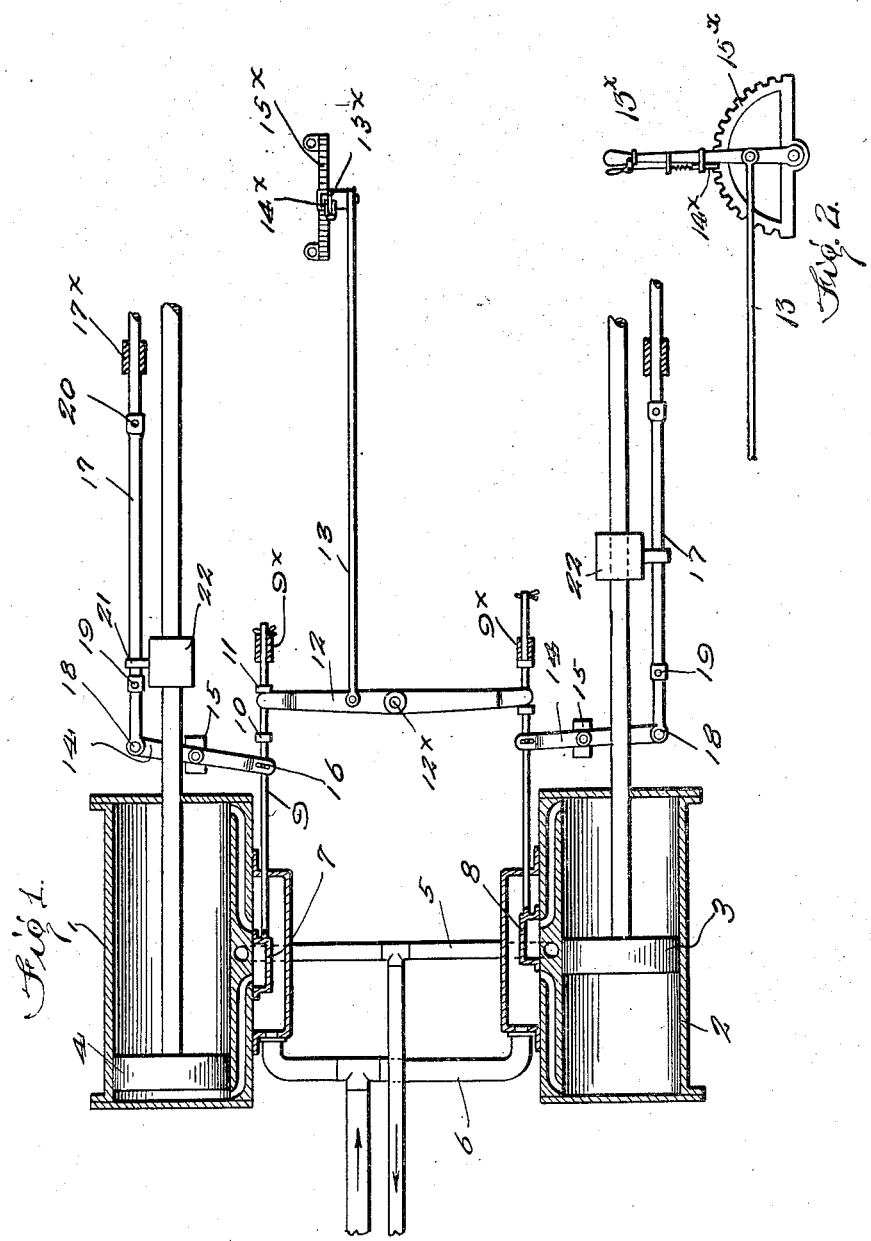
Frank Riesner
INVENTOR
BY *Victor J. Evans*
ATTORNEY
R O Thomas
Thomas E Turpin
WITNESSES Patented Oct. 9, 1923.

1,470,483

UNITED STATES PATENT OFFICE.

FRANK RIESNER, OF ORISKA, NORTH DAKOTA.

REVERSE-VALVE MECHANISM.

Application filed July 26, 1921. Serial No. 487,631.

*To all whom it may concern:*

Be it known that I, FRANK RIESNER, a citizen of the United States, residing at Oriska, in the county of Barnes and State of North Dakota, have invented new and useful Improvements in Reverse-Valve Mechanism, of which the following is a specification.

The object of my present invention is the provision of simple, inexpensive and efficient reverse valve mechanism designed more especially for use in conjunction with a hydraulic motor and intermediate of the motor and the drive wheels of an automobile or the like.

To the attainment of the foregoing, the invention consists in the improvement as hereinafter described and definitely claimed.

In the accompanying drawings, forming part hereof:—

Figure 1 is a view partly in plan and partly in section illustrative of the best practical embodiment of my invention of which I am cognizant.

Figure 2 is a detail side elevation illustrating the hand lever, and the means for adjustably fixing the same.

Similar numerals of reference designate corresponding parts in both views of the drawing.

1 and 2 designate a pair of cylinders in which work the pistons 3 and 4. The fluid inlet pipe 6 and outlet pipe 5 are alternately thrown into communication with the ends of the cylinder by the slide valves 7 and 8.

As the valve mechanism for operating each slide valve is of identical construction the following description will be limited to that associated with valve 7. The stem 9 of the valve 7 has fixed thereto collars 10 and 11, which are adapted to be alternately engaged by the end of the pivot lever 12. The lever 12 is fulcrumed at 12×. Said stem 9 is guided in a stationary support 9×. The lever 12 is giving alternate movements by the control rod 13, which may be operated manually in any suitable manner though I prefer to employ a hand lever 13× connected to the control rod 13 and equipped with a detent 14× for cooperation with a fixed segmental rack 15×. A link 14 is pivoted to a stationary support 15. One end of the link 14 has a pin and slot connection 16 with the stem 9. For the purpose of giving movements to the link 14, I provide a slide 17 pivotally connected to the opposite end of the link as indicated 18, and having projections 19 and 20 which are arranged to be alternately engaged by a tappet projection 21 carried by the block 22 on the piston rod 22×. The said piston rod is designed to be connected in any conventional manner with a rotary disk connected by appropriate gearing with an automobile axle. Attention is called to the fact that the projections 19 and 20 are so disposed that they will be engaged by the projection 21 just before the piston 4 reaches its limit of travel in either direction. This kick of the slide 17 at the termination of the travel of the piston throws the mechanism into a position to move the valve 7 to its other position.

It will be apparent from the foregoing that through the medium of my novel valve mechanism a hydraulic motor can be reversed at any time through the medium of the control rod 13. With the parts arranged as shown the piston 2 is moved in one direction, and the piston in the cylinder 1 is at the end of its traverse in the opposite direction. Therefore when the control rod 13 is pulled or moved backwardly, the valves will reverse the motor.

The slides 17 are guided at 17× in stationary supports.

Having described my invention, what I claim and desire to secure by Letters-Patent, is:—

Reverse valve mechanism for hydraulic motors comprising piston cylinders, pistons movable therein and having rods on which are tappet projections, valve casings associated with the cylinders, a fluid supply conduit connected with the valve casings, an exhaust conduit connected with the exhaust ports of the cylinders, slide valves operable in the casings and having stems on which are spaced collars, levers connected with said stems, means supporting the levers, means to actuate said levers and reciprocate the valves, a lever fulcrumed at an intermediate point of its length and having its end portions arranged between the collars on the stems to cooperate with said collars, and manual means to move said lever to reverse the motors.

In testimony whereof I affix my signature.

FRANK RIESNER.